US00RE37985E

(19) United States
(12) Reissued Patent
Felsen

(10) Patent Number: US RE37,985 E
(45) Date of Reissued Patent: Feb. 11, 2003

(54) LINEAR AIR DIFFUSER

(75) Inventor: Karl H. Felsen, Winnipeg (CA)

(73) Assignee: E. H. Price Limited, Winnipeg (CA)

(21) Appl. No.: 09/631,972

(22) Filed: Aug. 3, 2000

Related U.S. Patent Documents

Reissue of:
(64) Patent No.: 5,788,572
Issued: Aug. 4, 1998
Appl. No.: 08/835,983
Filed: Apr. 11, 1997

(51) Int. Cl.[7] ..... F24F 13/072
(52) U.S. Cl. ..... 454/303
(58) Field of Search ..... 454/292, 301, 454/303, 304

(56) References Cited

U.S. PATENT DOCUMENTS 3,411,425 A * 11/1968 Lambert
3,444,801 A * 5/1969 Lambert ..... 454/303
3,757,667 A * 9/1973 Lambert
4,316,407 A * 2/1982 Lambert
4,426,918 A * 1/1984 Lambert
4,449,166 A * 5/1984 Sharp ..... 454/149
4,491,062 A * 1/1985 Sylvester et al. ..... 454/303
4,869,157 A * 9/1989 Hungerford
5,001,967 A * 3/1991 Hungerford ..... 454/303 X
5,215,284 A * 6/1993 Hungerford ..... 248/225.3
5,433,662 A * 7/1995 Hungerford ..... 454/303

* cited by examiner

*Primary Examiner*—Harold Joyce
(74) *Attorney, Agent, or Firm*—Foley & Lardner

(57) ABSTRACT

A linear air diffuser apparatus has two parallel longitudinal rails maintained spaced by two or more transverse connectors. Two or more blade-like adjustable air flow control members extend longitudinally between the connectors. Each flow control member has a planar blade end portion at each longitudinally outer end. Each connector has an upper block and a lower block with the blade end portions received between them. One or both of the blocks has on a side facing the end portions a polymeric resiliently compressible piece that is compressed between the blocks and exerts a resilient reaction urging and gripping the end portions stably between blocks so that they are not prone to vibrate.

36 Claims, 6 Drawing Sheets

LINEAR AIR DIFFUSER

Matter enclosed in heavy brackets [ ] appears in the original patent but forms no part of this reissue specification; matter printed in italics indicates the additions made by reissue.

BACKGROUND OF THE INVENTION

The present invention relates to a linear diffuser apparatus.

Slot type ceiling linear diffuser apparatus is often incorporated in suspended ceiling systems. Linear air diffusers may for example be used along perimeter locations in particular near large window walls which are exposed to either a significantly hotter or significantly colder external environment. Window walls tend to be highly conductive, and by convection due to the resulting temperature gradient, can rapidly alter the temperature and character of diffused air flow in their vicinity. This causes non-uniform room air conditions. Linear type air diffusers can be utilized anywhere in a suspended ceiling system to achieve uniform room temperature by providing air curtains, directional air flow and air jets for rapid mixing of supply air and room air. Such diffusers usually capture within them laterally shiftable flow control members that can be adjusted to alter the position, direction or flow rate of the air flow exiting the diffuser.

Known linear diffuser apparatus of which the applicant is aware has not been as convenient as is desirable to assemble and install. Further, known linear air diffuser apparatus often gives rise to problems of vibration of the usually metal components, with resultant problems of a rattling or whistling noise nuisance.

BRIEF SUMMARY OF THE INVENTION

The present invention provides linear air diffuser apparatus comprising two longitudinal rails maintained in laterally spaced parallel condition by at least two transverse connector members each connected at its opposite ends to a respective one of said parallel rails, at least two adjustable air flow control members extending longitudinally between said connector members, each flow control member having a planar blade end portion at each longitudinally outer end, and wherein each connector member comprises an upper block and a lower block with said blade end portions received between said upper and lower blocks and at least one of said blocks provided on a side facing said end portions with a polymeric resiliently compressible engagement member compressed between the blocks and exerting a resilient reaction urging and gripping said end portions against the other of said blocks.

With this arrangement, the compression of the resilient engagement member on the planar end portions may serve to reduce air flow outwardly longitudinally, so that vibration producing air flows are reduced or eliminated, while the direct engagement of the compressible engagement member on the planar end portions provides a stable assembly that is much less prone to vibration than known arrangements. In the preferred form, the compressible engagement member may be connected as a unit to a block, so that assembly and installation of the apparatus is greatly simplified, without requiring assembly and application of small pieces that are prone to be misplaced or lost.

Further, the upper and lower blocks constituting the transverse connector members assure parallelism or straightness and adequate rigidity for the assembled linear diffuser apparatus.

BRIEF DESCRIPTION OF THE SEVERAL VIEWS OF THE DRAWINGS

FIGS. 12 and 13 are cross sectional and side elevational views of a hanger member for use with a modified form of the connector block of the diffuser of the invention, wherein FIG. 12 is a section on the lines 12—12 in FIG. 13.

DETAILED DESCRIPTION OF THE INVENTION

Figure 1:
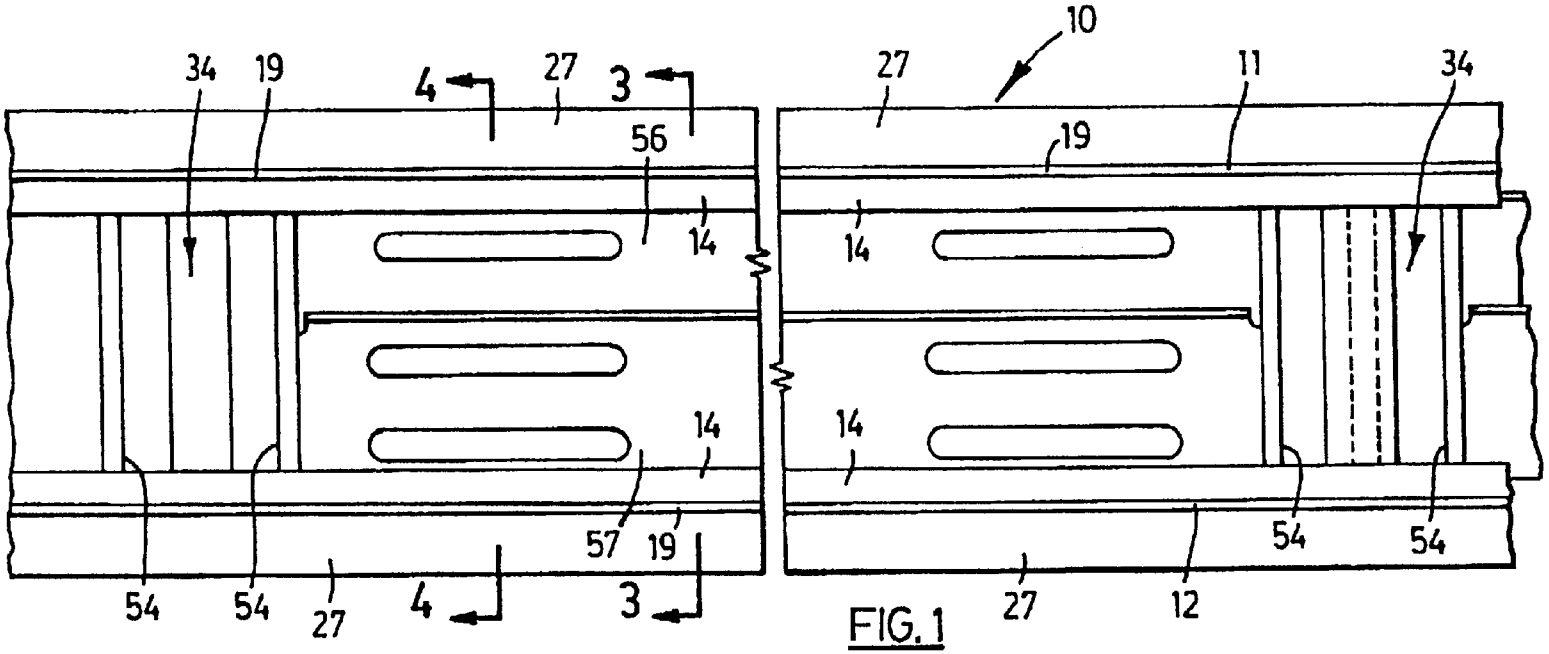
FIG. 1 is a partial plan view of linear diffuser apparatus in accordance with the invention.
Figure 2:
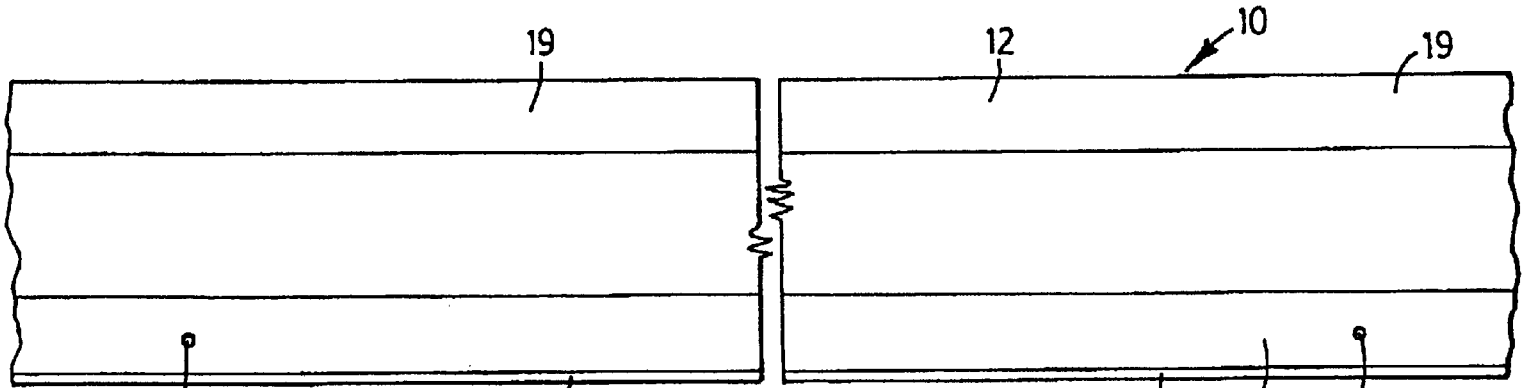
FIG. 2 is a side elevational view of the apparatus of FIG. 1.

Referring to the drawings, wherein like reference numerals indicate like parts, a linear air diffuser 10 comprises first and second longitudinal rails 11 and 12. Each rail 11 and 12 may be extruded, for example from aluminum.

Each rail comprises a main vertical rail portion 13 having adjacent its upper end an inwardly directed flange 14 and down turned lip flange 16 and adjacent its lower end an inwardly directed flange 17 with an upturned lip flange 18.

An upper rail portion 19 is offset slightly outwardly from the main portion 13 and is connected thereto by a connector flange 21. The flange 21 provides a ledge on which a plenum chamber may be seated.

A lower rail portion 22 is also offset slightly outwardly from the main rail portion 13, and is connected thereto by a connector flange 23.

Each flange 11 and 12 has connected on its lower edge an inverted T section rail 25, preferably extruded for example from aluminum. The T rail 25 includes a horizontal flange 24 which extends inwardly from the lower rail portion 22 to provide a lower air outlet slot 26 somewhat narrower than the spacing between the rail portions 13. Preferably, the T rail 25 includes a flange 27 that extends outwardly from the lower rail portion 22, to provide a horizontal surface for reception of T bars, ceiling tiles and like elements of ceiling structures.

In the preferred form, the inner face of the flange 28 of the T section rail 25 is secured on the outer face of each lower rail portion 22 and is clinch-locked thereto by means of small circular portions 29 of the flange 28 and of the rail portions 22 that are struck inwardly to provide a rivet-like connection at intervals.

In the preferred form, the connection flange 21 has a down turned outer portion 31 parallel to and spaced outwardly from the main rail portion 13, and preferably aligned with the upper rail portion 19, and the lower connection flange 23 has an upturned flange 32 spaced similarly from the outer flank of the main rail portion 13. Preferably the flanges 28, 32, 31 and 19 are all in vertical alignment to provide flush surfaces against which ceiling elements such as T bars may be abutted.

Figure 9:
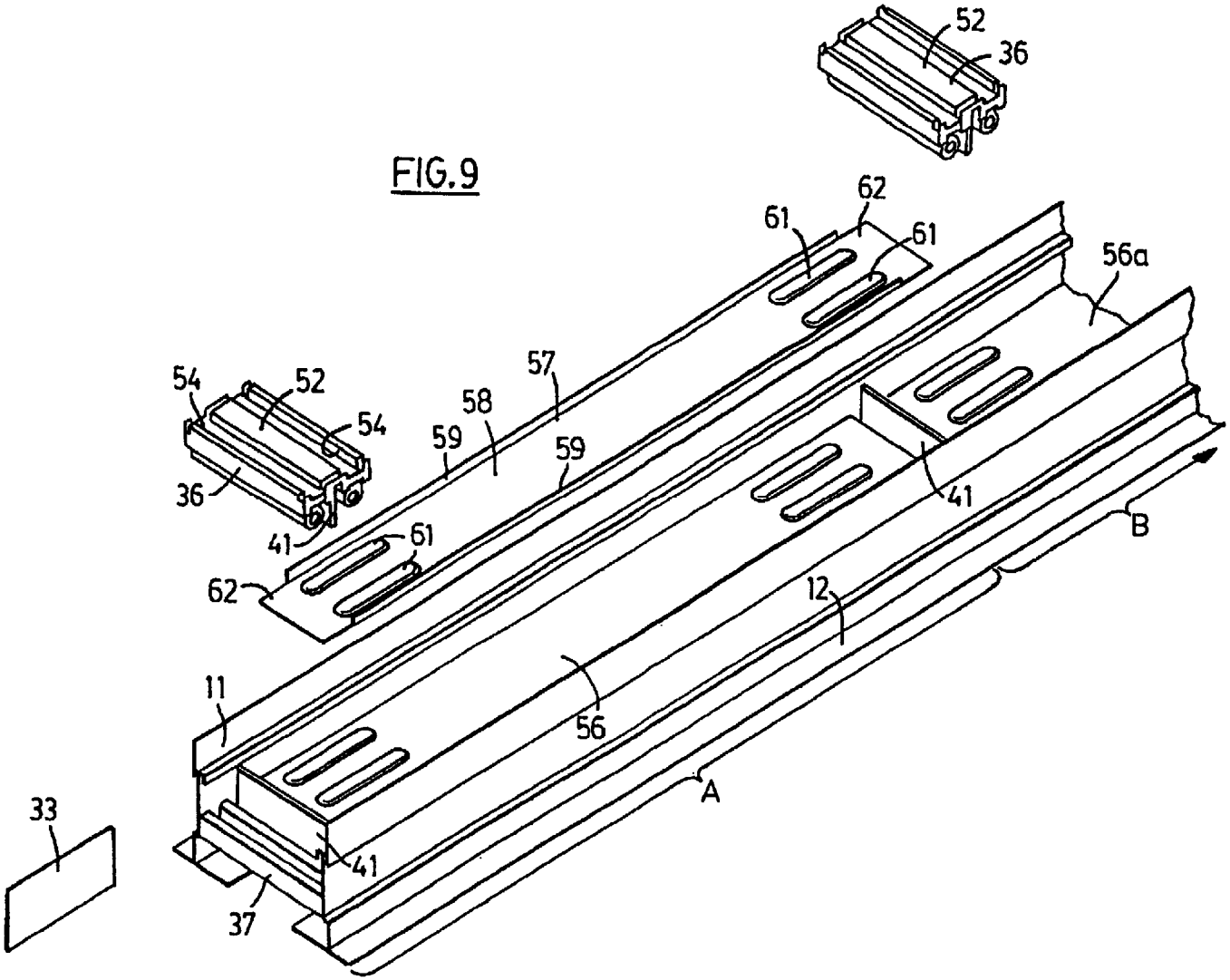
FIG. 9 is a partial perspective view of the first embodiment of the diffuser apparatus of FIGS. 1 to 8 illustrating the apparatus in the course of assembly.

A rectangular connection plate 33, shown in FIG. 9, may be used to connect co-linearly lengths of rails such as rails 11 and 12. The width of the plate 33 is slightly less than the spacing between the outer generally C-shaped recesses formed between on the one hand between the outer side of the main rail portion 13, connection flange 21 and down turned flange 31 and on the other hand between the outer side of the main rail portion 13, connection flange 23 and upturned rail 32, so that the plate 33 is snugly received. Connection plate 33 may be used on each side of the diffuser apparatus to connect longitudinally between rails similar to the rails 11 and 12 in order to provide increased length for the rails 11 and 12 and for the linear diffuser.

Figure 3:
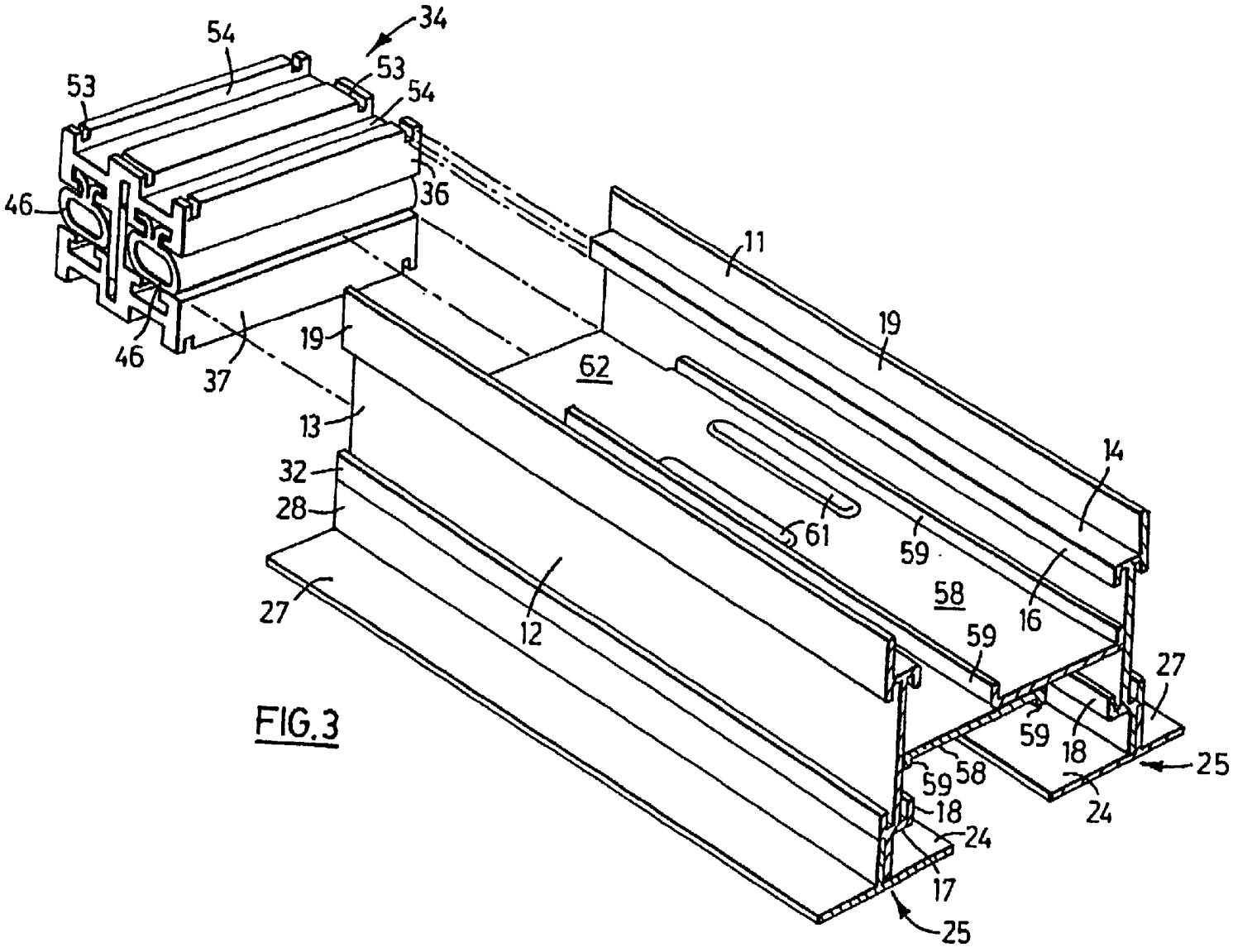
FIG. 3 is a partially exploded perspective of a portion of the apparatus of FIG. 1 taken on the arrows 3—3 in FIG. 1.
Figure 5:
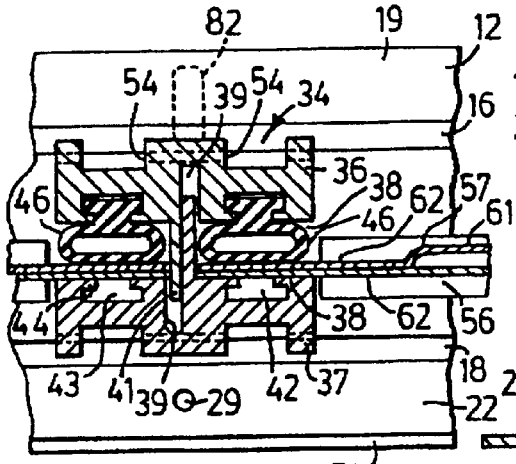
FIG. 5 is a longitudinal cross section taken on the line 5—5 of FIG. 4 through the connector blocks.

The rails 11 and 12 are maintained in spaced parallel arrangement by transverse connector members 34. As best seen in FIGS. 3, 5 and 9, each connector member 34 comprises an upper block 36 and a lower block 37. Preferably, the blocks 36 and 37 are relatively sturdy and each may be a length served from an extrusion, for example an aluminum extrusion. The blocks 36 and 37 may be similar, and severed from a common extrusion, as shown, or may be of different cross-sections.

Each block 36 and 37 is generally rectangular in form, and has a generally planar inner face 38 in approximately the center of which is a transverse outwardly extending slot 39. In the examples shown, the slot 39 is slightly offset toward one end of each block, and adjacent to the slot 39 and offset therefrom toward the other end of the block is a transverse outwardly extending plate member in the form of a tongue 41, so that, when one block 36 is inverted with respect to the other block 37 and the blocks are applied together face to face, the tongue 41 of one block is received within the slot 39 of the other block.

Since the blocks 36 and 37 are in the preferred form extrusions, as will be appreciated, the slots 39 and tongues 41 run the full length of the blocks 36 and 37.

Longitudinally outwardly from each side of the tongue 41 and slot 39 the planar inner face 38 is further interrupted by a channel formation with re-entrant edges, that is to say a C-shaped channel 42. Each of these channels has a channel bottom 43 and inward or re-entrant edge flanges 44.

Figure 6:
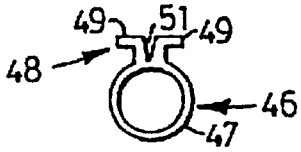
FIG. 6 is an elevation of the compressible engagement member used in the assembly of FIG. 5.
Figure 7:
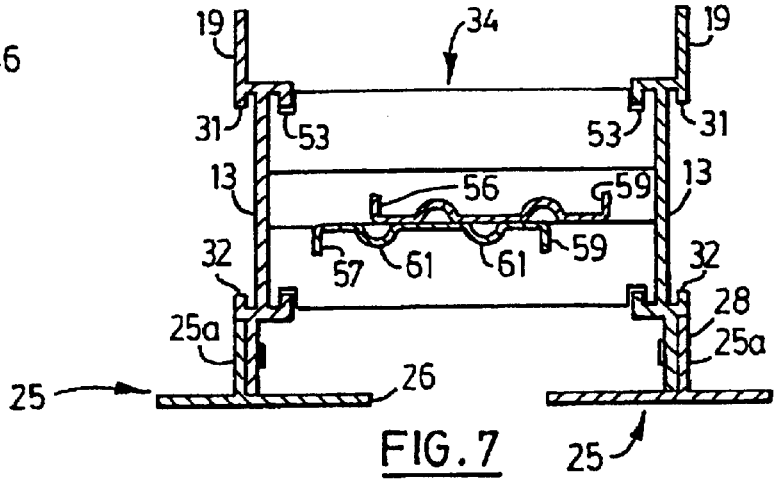
FIG. 7 is a transverse cross section similar to FIG. 4 showing adjustment of the air flow control members to a relatively open position.

At least one of the blocks 36 and 37, and, optionally both blocks 36 and 37, are provided with a pair of resiliently compressible engagement members received in the re-entrant edge channels 42. These engagement members 46 are captured in the said channels 42 in and protrude inwardly beyond the plane of the inner face 38. In the preferred form, as seen in FIG. 6, each engagement member 46 comprises an open-ended tubular engagement portion 47 having on one side a generally T-shaped base 48 formed from two L-shaped ear portions 49 separated by a V-shaped notch 51. In manufacture, the portions 49 are compressed together and slid lengthwise into the channels 42. The outwardly directed resilient reaction firmly retains the L-shaped portions 49 seated and captured in the re-entrant portions of the channel 42 adjacent the channel base 43. The engagement member 46 is preferably formed from a relatively stiffly resiliently flexible polymer, for example cured or vulcanized natural or synthetic rubber, or a similar elastomeric materials, such as a vinyl polymer rubber blend.

As will be appreciated, the length of the block members 36 and 37 of the connector members 34 determine the lateral spacing of the rails 11 and 12, and, in the assembled condition, the outer ends of the block members 36 and 37 abut the inner sides of the main rail portions 13.

Adjacent each laterally outer end, each block portion 36 and 37 is formed on its outer face 52 with a longitudinally extending kerf or groove 53. Each groove 53 is spaced inwardly from the adjacent end of the block 36 or 37 a distance equal to the inward spacing of the down turned and upturned flanges 16 and 17 from the inner face of the main rail portion 13 of each side rail 11 and 12.

As will be appreciated, each groove 53 may be formed by cutting or machining transversely across each extrusion piece in the case in which the blocks 36 and 37 are pieces severed from an extrusion.

Preferably, the outer face 52 of the blocks 36 and 37 are formed with transversely extending grooves 54 that may serve to reduce the mass of the blocks. In the case of the embodiment of FIGS. 1 to 7, 9 and 10, as well as in the embodiment of FIG. 8, these grooves 54 may be generally rectangular, as best seen in FIG. 5.

The linear air diffuser apparatus further comprises blade-like adjustable air flow controller members, indicated by reference numerals 56 and 57 in FIGS. 1 to 7, 9 and 10. The two members 56 and 57 may be similar or identical to one another. Each may be stamped from, for example, sheet steel. In the example shown, each comprises a generally rectangular planar main or central portion 58 which may be of shallow channel section having squat channel sides 59. Adjacent each end, each member is formed with a pair of elongated finger grip portions 61 with rounded ends that are embossed upwardly in the direction in which the channel sides 59 extend.

Longitudinally outwardly from the embossed portions 61 each member 56 and 57 comprises a planar end portion 62 that in the preferred form is generally rectangular, slightly narrower than, and of the same thickness as the central portion 58 of the member 56 or 57, and has smoothly planar upper and lower sides.

In the assembled condition, as best seen in FIG. 5, these planar end portions 62 are firmly retained by being gripped compressively between the upper face of the lower block 37 and the engagement member 46 of the upper block 36.

In use, the elements described above may be employed for assembly of a diffuser apparatus having separately controllable or adjustable air distribution sections along its length. Each such section is defined by at least a pair of the flow control members 56 and 57 confined at each end by engagement in a transverse connector 34 each comprising an upper block 36 and a lower block 37. For example, as seen in FIG. 9, one such section is indicated at A, while an adjacent section indicated at B comprises further blade like flow control members that may be similar to or different from members 56 and 57, of which one blade member 56a is seen in FIG. 9. Usually, a linear air diffuser formed from the structure of the present invention, and comprising one or more sets of rails 11 and 12 joined by connection plates 33, will comprise a multiplicity of such sections. Each section or a number of adjacent sections may be provided with its own or their own air inlet service. Usually, air inlet to the diffuser section is provided by a box-like plenum structure secured in generally conventional air tight manner to the upper side of a connector member 34 and seated within the upper side of the rails 11 and 12. In this way, air having different characteristics may be supplied from adjoining sections. For example, it may be desired to provide relatively warm air through section A and relatively cooler air through section B.

Figure 4:
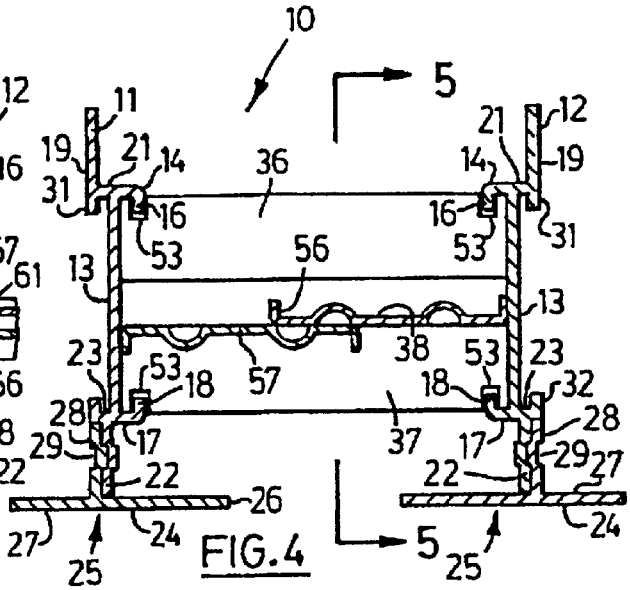
FIG. 4 is a cross sectional elevation taken on the lines 4—4 in FIG. 1.

In assembling the air diffuser, the lower blocks 36 are engaged with the rails 11 and 12 by hooking the upturned lip flange 18 of firstly one rail 11 and then the other rail 12 into the grooves 53 of the lower block member 37, as seen in FIG. 4. The blocks 37 are spaced apart along the length of the diffuser at standard center spacings corresponding to the standard lengths of the flow control members 56 and 57. The flow control members 56 and 57 are then applied on the upper side of the blocks 37, with the planar end portion 62 lodging on the upwardly facing inner side surfaces 38 of the lower blocks inwardly from the tongue portions 41.

The members 56 and 57 are preferably inverted with respect to one another, so that the outer sides of the channels are in engagement, as seen in FIG. 4.

Figure 10:
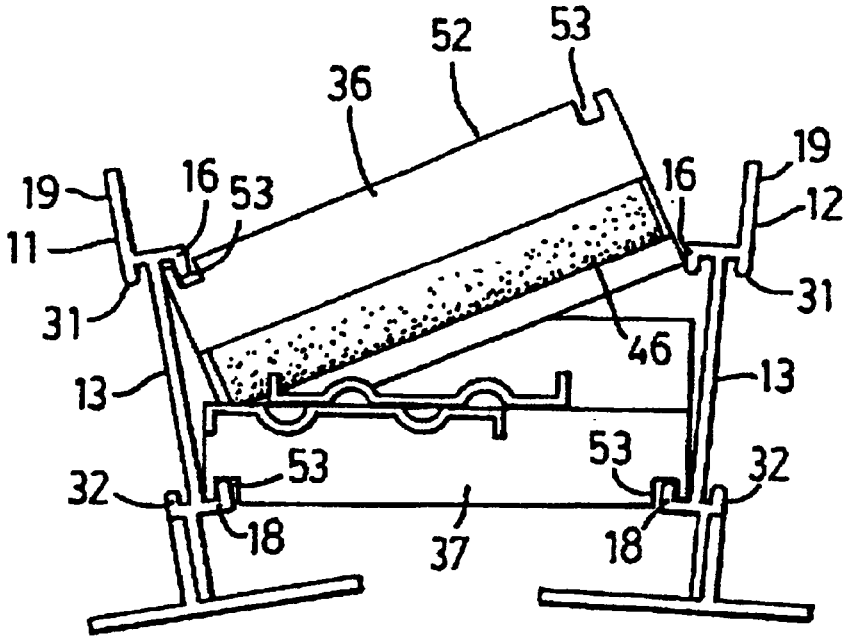
FIG. 10 is an end view, partially in section, illustrating the assembly of the upper block to a lower block.

The upper blocks 36 are then applied, as seen in FIGS. 9 and 10. A downwardly turned lip flange 16 of one rail, for example rail 11 and seen in FIG. 10 is first hooked into the grooves 53 at one end of the upper block 36, and the rails are then upwardly tilted outwardly with respect to one another, as seen in FIG. 10, and pressure applied on the upper face 52 of the upper block 36 to compress the engagement member 46 somewhat beyond the state of compression shown in FIG. 5 until the upper face 52 of the upper block 36 extends a little below the lower end of the down turned lip flange 16, at which point the flange 16 can snap into the groove 53. Pressure on the upper block 36 may then be released so that the engagement members 46 expand somewhat to the normal or installed conditions seen in FIGS. 4 and 5.

The rails 11 and 12 have sufficient flexibility to allow upper blocks 36 to be installed progressively at points spaced along the length of the linear diffuser.

In the installed position, as seen in FIGS. 4 and 5, the resilient reaction of the compressed members 46 acting between the blocks 36 and 37 through the superimposed blade end portions 62 urges the blocks 36 and 37 vertically apart so that the portions outwardly and upstanding with respect to the grooves 53 are lodged tightly within the inner channel recesses defined between the down turned lip flanges 16 and the inner side of the main portion 13 at the upper region and between the upturned lip flanges 18 and the inner side of the main portion 13 at the lower region. This secures the rails 11 and 12 to the connector members 34. Since the blocks 36 and 37 are relatively sturdy and of substantially constant cross-section except at the shallow grooves 53, they provide a connection between the rails 11 and 12 of exceptional strength and stability.

The resilient reaction between the engagement members 46 of the blade end portions 62 retains the portions 62 pressed firmly against the inner face 38 of the lower block 36. Since the portion 62 and face 38 are planar, the pressure of the members 46 retains the portions 62, usually at least partially superimposed, stably in tightly compressed condition of the face 38 and sufficient pressure can be exerted by the member 46 that there is no tendency for the members 62 to vibrate relative to one another or relative to the face 38. Hence rattling, whistling or other noises can be avoided.

After the air diffuser apparatus has been installed in a ceiling, adjustment of the positioning of the flow controlling members 56 and 57 may be made from below the ceiling when desired, for example for the purpose of adjusting different sections to provide different types or directions of air flow. For example the members may be adjusted from the position shown in FIG. 4 to the position shown in FIG. 7. Such adjustments are carried out by inserting the finger tips or a tool upwardly through the slot 26 and shifting the members 56 and 57 laterally to the desired positions. The resilient reaction of the resilient engagement members 46 with the planar end portions 62 allows the end portions 62 to slide relative to one another and relative to the engagement members 46 and blocks 36 and 37 on application of moderate lateral pressure. The embossments 61 and channel sides 59 provide laterally facing surfaces against which lateral finger tip or tool pressure may conveniently be applied.

Since the members 46 can be pre-assembled to the blocks 36, to provide a unit having the members 46 captured therein, the parts of the diffuser can be supplied to installers without small loose parts that may become lost or mislaid and that may tend to inconvenience or delay the work of the installers.

Preferably, each engagement member 46 is of open cross-section, for example is tubular in form, as seen in FIG. 6, so that it is resiliently compressible. Other forms of gas containing engagement structure are, of course possible, such as engagement members formed from expanded or foam rubber, resilient plastic or resilient natural or synthetic elastomer, or the like.

In the preferred form, the engagement members 46 function as air-excluding gaskets, and extend continuously transversely substantially the entire distance between the rails 11 and 12. Preferably, the gasket-like resiliently compressible engagement member 46 extends a length at least 90% and more preferably at least about 95% distance between the rails 11 and 12 or the length of the block member 36. In this manner, the engagement member may effectively prevent flow of air longitudinally outwardly from the region of the opposed end portions 62 of the flow controlling members 56 and 57.

One advantage of the arrangement wherein the upper rail 13 and T section rail 25 are separate pieces united together, for example by clinch locking, is that the upper rails 13, as well as the blocks 36 and 37, the flow control members 56 and 57 and the engagement members 46, may be black or may be finished black, so they are readily seen from below, while the visible lower rail portion 25 may be finished a lighter color, for example white or any other color desired for a given ceiling constructions. Further, it facilitates the use of various different profiles of lower rail portion 25 to suit varying ceiling integration requirements. Moreover, curved diffuser sections are also more easily achieved by rolling and matching upper rails 13 and lower rails 25 to specified radii in concave or convex fashion.

Figure 11:
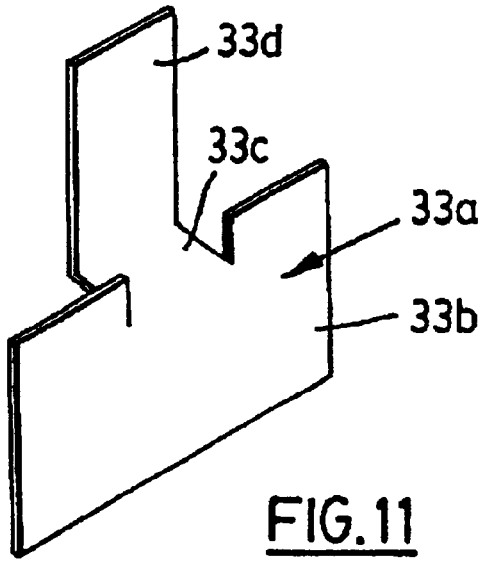
FIG. 11 is an isometric view of one form of modified form of connection plate.

As noted above, the diffuser may comprise a number of sets of the rails 11 and 12 joined co-linearly by connection plates 33. Modified forms of the connection plates 33 may be used to make connections to structural components such as ceiling support channels. An example of one such modified connection plate 33a is shown in FIG. 11 and comprises a rectangular plate body 33b similar to plate 33 adapted to be slid snugly endwise in the outer C-shaped recesses above referred to and defined by the rail portions 13 and flanges 26 and 31 at the upper region and 23 and 32 at the lower region of each rail such as rails 11 and 12. A portion 33c extends a distance below the upper edge of the plate 33b longer than and hence laterally below the upper flange 31 and outwardly a distance longer than the spacing between the flange 31 and the outer side of rail 13 and connects with an upwardly extending portion 33d extending upwardly above the upper edge of the plate body 33b a distance greater than the upper rail portion 19 so that the upper portion of the upwardly extending portion 33d may be used to make connections to structural components such as ceiling support channels. The connection plates 33a may be used to make a bridging connection between juxtaposed ends of sections of the rails 11 and 12, or may be slid endwise in said C-shaped recesses to positions intermediate the ends of the rails 11 and 12, so that a number of the connection plates may be used to make a connection to a single length of the diffuser structure, if desired.

The diffuser may be retained and supported in a ceiling structure, such as a conventional ceiling structure by usual attachment and suspension arrangements, for example fastener members connected to the upper rail portions 19 and connected to fixed portions of the building structure in a generally conventional manner, or by making connection to connector plates 33a as described above with reference to FIG. 11.

In a further preferred form, a novel form of suspension structure illustrated in FIGS. 12 to 15 is employed.

Figure 13:
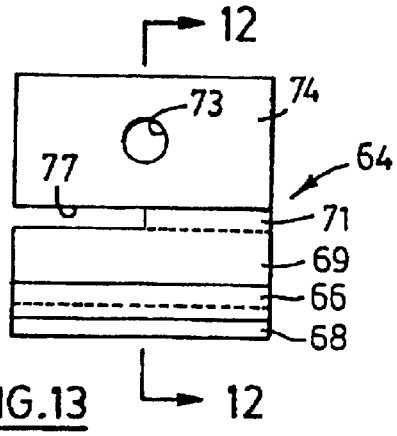

In this example, the blocks 36 and 37 are modified in that the transverse channels 54 on the outer sides of the blocks are re-entrant on one side, for example the longitudinally outer side, as seen in FIG. 13, wherein a re-entrant lip flange 63 is shown.

Figure 12:
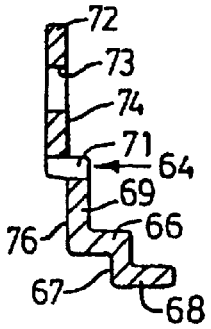

A pair of hook-in generally plate form hanger members 64 is employed. As seen in FIGS. 12 and 13, each hanger member 64 comprises a planar base portion 66 for seating on the outer face 52, a leg portion 67 extending downwardly the depth of the channel 54, and a lower hook-in plate portion 68 connected on the lower end of the leg 67 and extending substantially the width of the channel 54, so that the plate portion 68 can be hooked into the channel 54 by inclining it relative to the plane of the outer side 52 and then rocking it inwardly and downwardly to the position seen in FIG. 13. An intermediate plate portion 69 extends upwardly from the base and connects through a horizontal transition flange 71 to an upwardly extending upper flange portion 72 provided with a central opening 73. The longitudinally outer face 74 of the flange 72 is substantially coplanar with the longitudinally inner face 76 of the intermediate plate portion 69.

A transversely extending recess 77 is formed through the transition flange 71 and extends preferably half way along its length, as seen in FIG. 13.

Figure 14:
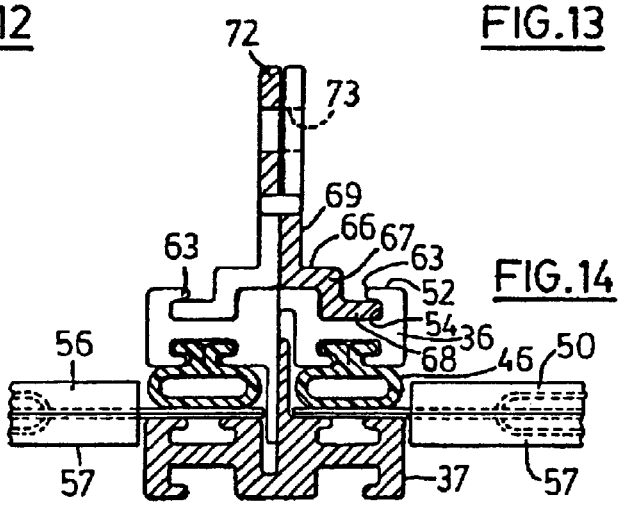
FIG. 14 is a partial cross section, somewhat similar to FIG. 5, through a modified form of the connector block and showing application of the hanger members.
Figure 15:
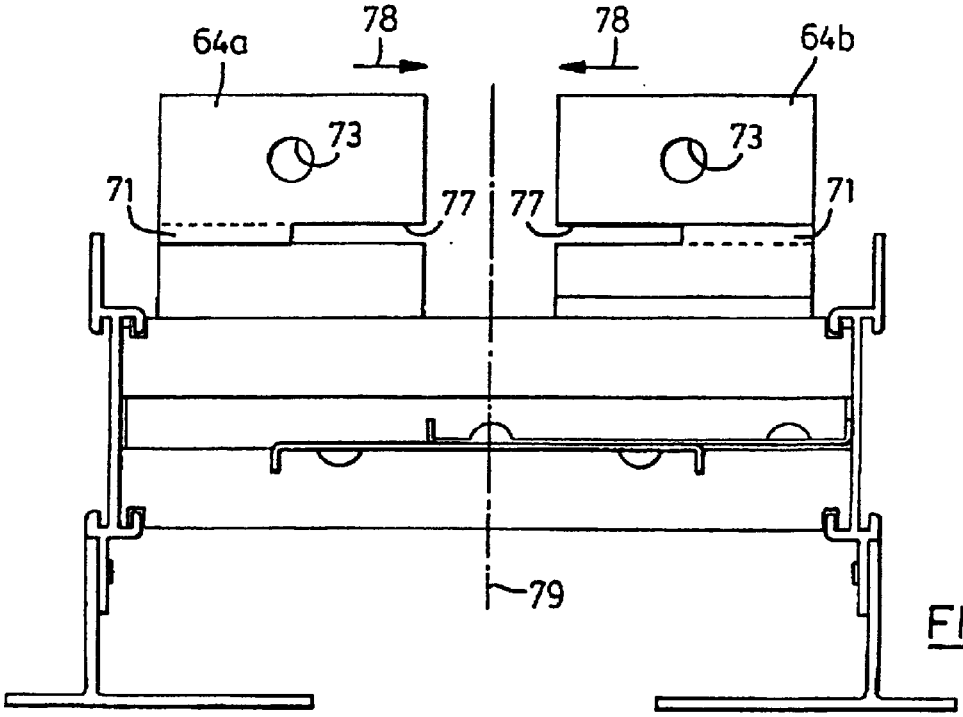
FIG. 15 is an end view, partially in transverse cross section, illustrating the modified connector block and hanger members of FIGS. 12 to 14 in the course of assembly.

In use, a pair of the hook-in members 64a and 64b, arranged in opposition to one another as seen in FIG. 14 is hooked into the channels 54, each with their recesses 77 extending inwardly and toward the other as seen in FIG. 15. The members 64a and 64b are then slid toward one another from the spaced condition of FIG. 15 in the directions indicated by the arrows 78 in FIG. 15 until the openings 73 are in register, preferably in alignment with the center line 79. In this position, each member 64a and 64b has its upper portion 72 on a side of the other member opposite to that side on which its intermediate portion 69 lies, and the two members 64a and 64b are locked together with the transition flange portion 71 of each member 64 received in the recess 77 of the other member, as seen in FIG. 14. A hanger connection can then be made to the aligned openings 73 for supporting the diffuser structure relative to a ceiling structure.

It will be appreciated that the principles of the above linear diffuser structure are readily adaptable for multiple-slot diffuser structures. Such structures may comprise two or more slots side by side and will comprise in addition to the outer rail 11 and 12 one or more intermediate rails parallel to the outer rails 11 and 12, with connectors such as connector 34 bridging between each outer rail 11 or 12 and an adjacent intermediate rail, and between adjacent intermediate rails if there are two or more intermediate rails. An example is seen in FIG. 8, wherein an intermediate rail 81 is employed having a main rail portion 13a, down turned lip flanges 16a and upturned lip flanges 18a for forming bridging connections to the block members 36 and 37 in the manner described above in detail in connection with FIGS. 1 to 7, 9 and 10, and having a lower rail portion 22a to which a slot defining T-shaped member 25a may be clinched-locked in the example shown to provide two relatively narrow outlet slots 26a and 26b side by side.

Further, as will be appreciated, the flow control members 56 and 57 described above in detail are merely exemplary of various flow control members that may be employed. Numerous profiles of linear diffuser flow control members are known in the prior art and all such profiles may be employed with the apparatus of the invention requiring only that the members should be modified to provide them with planar end extensions similar to the end portions 62 illustrated for the members 56 and 57 with reference to FIG. 9 above, so that these can be retained in the manner described above in detail with reference to FIG. 5 of the drawings.

Figure 8:
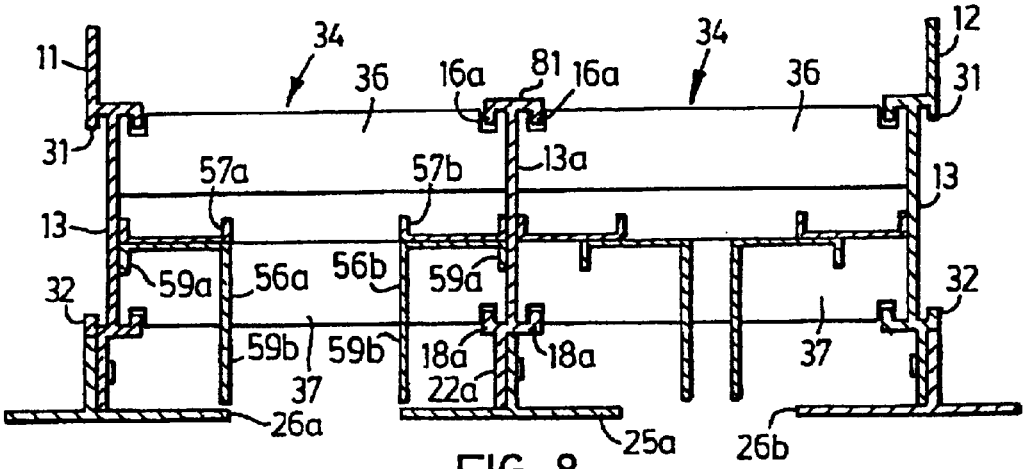
FIG. 8 shows a transverse cross section through a second embodiment of linear diffuser apparatus in accordance with the invention having dual slots.

For example, FIG. 8 shows an arrangement wherein each slot is provided with four flow control members comprising two upper shallow channel section members 57a and 57b and two lower blade members 56a and 56b. Each member 56a and 56b has on its laterally outer edge a relatively shallow channel side portion 59a, while on the inner side, the side portion 59b is greatly elongated, whereby adjustment of the flow control members 59b, as illustrated, for example by the different degrees of adjustment illustrated in the left hand and right hand slots in FIG. 8, for example the nature or direction of the flow of air can be adjusted significantly.

Numerous other configurations and arrangements of flow control members may be employed.

Other modifications of the structure are possible.

For example, instead of each block member 36 and 37 having an integral tongue 41 and a recess 39, each member may be provided with only a transversely extending longitudinally generally central recess, so that the recesses are vertically aligned when the blocks 36 and 37 are superimposed. In this case, in the course of assembly of the diffuser structure, after engaging the lower block members with the rails 11 and 12 a rectangular plate member of thickness such that it is snugly received in the recess in the lower block 37, and of length equal to the length of the blocks 36 and 37 is inserted into the recess in the lower block member following which the blade-like flow control members 56 and 57 and the upper blocks 36 are applied so that the plate members enter the recess of the upper blocks.

As with the tongues 41, the plates serve as non-rotatable vertical guide means preventing lateral shifting or rotation of one block 36 or 37 relative to the other about a transverse axis as may tend to be caused by the resilient reaction of the members 46.

Upper blocks 36 may be formed from an extrusion different from lower blocks 37. For example upper blocks 36 may be formed with a fin 82 shown in broken lines in FIG. 5 through which openings may be made to provide an attachment point for support wires or other support members.

I claim:

1. Linear air diffuser apparatus comprising two longitudinal rails maintained in laterally spaced parallel condition by at least two transverse connector members each connected at its opposite ends to a respective one of said parallel rails, at least two adjustable air flow control members extending longitudinally between said connector members, each flow control member having a planar blade end portion at each longitudinally outer end, and wherein each connector member comprises an upper block and a lower block with said blade end portions received between said upper and lower blocks and at least one of said blocks provided on a side facing said end potions with a polymeric resiliently compressible engagement member compressed between the blocks and exerting a resilient reaction urging and gripping said end portions against the other of said blocks.

2. Apparatus as claimed in claim 1 wherein said engagement member extends continuously substantially the entire length of the distance between the rails.

3. Apparatus as claimed in claim 1 wherein each engagement member is captured in a transversely extending recess in said at least one block.

4. Apparatus as claimed in claim 3 wherein the recess is C shaped and the engagement member has on one side a pair of longitudinally outwardly directed ears received in said C shaped recess.

5. Apparatus as claimed in claim 1 wherein the engagement member is tubular.

6. Apparatus as claimed in claim 1 wherein each rail has on an inner face a downwardly open channel recess at an upper region and an upwardly open channel recess at a lower region and each block having an upstanding portion adjacent each end, and a resilient reaction exerted by said engagement member lodges each said upstanding portion in a respective adjacent channel recess.

7. Apparatus as claimed in claim 6 wherein each said upstanding portion is defined between a longitudinally extending groove formed in a vertically outer face of the block and an adjacent end surface of the block.

8. Apparatus as claimed in claim 1 wherein each block comprises a length severed from an extrusion.

9. Apparatus as claimed in claim 1 wherein each one of said blocks has a transversely extending recess in an intermediate region, said recesses each receiving a vertically extending plate member secured non-rotatably relative to the other block.

10. Apparatus as claimed in claim 9 wherein each block is formed with an integral vertically outwardly extending tongue constituting said plate member.

11. Apparatus as claimed in claim 1 wherein an upper side of each upper block is formed with a pair of transversely extending channels.

12. Apparatus as claimed in claim 11 wherein a side of each transversely extending channel is provided with a re-entrant lip flange that retains a hook-in hanger member.

13. Apparatus as claimed in claim 12 wherein said re-entrant lip flange is on a longitudinally outer side of each channel and said hanger member comprises a pair of hanger elements each having an upper portion offset from an intermediate portion, a laterally extending recess and a transition portion between said upper and intermediate portions, each upper portion having an opening therethrough, and said elements sliding from a spaced condition to an aligned condition wherein the openings are in register and the upper portion of each element is disposed on a side of the other element opposite a side that said intermediate portion is disposed on, with a transition portion of each element received in the recess of the other element.

14. Apparatus as claimed in claim 1 comprising a separate inverted T-section piece connected to a lower end of each said longitudinal rail.

15. Apparatus as claimed in claim 14 wherein each T-section piece comprises an upper clinch-locked to each said longitudinal rail.

16. Apparatus as claimed in claim 14 wherein each said longitudinal rail is finished black and each T-section piece is finished a lighter color.

17. Apparatus as claimed in claim 1 wherein each said longitudinal rail has on an outer side a C-shaped recess receiving at least one connection plate.

18. Apparatus as claimed in claim 17 wherein said connection plate includes a portion extending laterally outwardly and upwardly beyond an upper edge of said longitudinal rail.

*19. Linear air diffuser apparatus comprising:*

*two longitudinal rails maintained in laterally spaced parallel condition by at least two transverse connector members each connected at its opposite ends to a respective one of said parallel rails; and*

*at least two adjustable air flow control members extending longitudinally between said connector members, each flow control member having a planar blade end portion at each longitudinally outer end,*

*wherein each connector member comprises an upper block and a lower block with said blade end portions received between said upper and lower blocks and at least one of said blocks provided on a side facing said end portions with a resiliently compressible engagement member compressed between the blocks and exerting a resilient reaction urging and gripping said end portions against the other of said blocks.*

*20. Apparatus as claimed in claim 19 wherein said engagement member extends continuously substantially the entire length of the distance between the rails.*

*21. Apparatus as claimed in claim 19 wherein each engagement member is captured in a transversely extending recess in said at least one block.*

*22. Apparatus as claimed in claim 21 wherein the recess is C shaped and the engagement member has on one side a pair of longitudinally outwardly directed ears received in said C shaped recess.*

*23. Apparatus as claimed in claim 19 wherein each rail has on an inner face a downwardly open channel recess at an upper region and an upwardly open channel recess at a lower region and each block having an upstanding portion adjacent each end, and a resilient reaction exerted by said engagement member lodges each said upstanding portion in a respective adjacent channel recess.*

*24. Apparatus as claimed in claim 23 wherein each said upstanding portion is defined between a longitudinally extending groove formed in a vertically outer face of the block and an adjacent end surface of the block.*

*25. Apparatus as claimed in claim 19 wherein each block comprises a length severed from an extrusion.*

*26. Apparatus as claimed in claim 19 wherein an upper side of each upper block is formed with a pair of transversely extending channels.*

*27. Apparatus as claimed in claim 26 wherein a side of each transversely extending channel is provided with a re-entrant lip flange that retains a hook-in hanger member.*

*28. Apparatus as claimed in claim 27 wherein said re-entrant lip flange is on a longitudinally outer side of each channel and said hanger member comprises a pair of hanger elements each having an upper portion offset from an intermediate portion, a laterally extending recess and a transition portion between said upper and intermediate portions, each upper portion having an opening therethrough, and said elements sliding from a spaced condition to an aligned condition wherein the openings are in register and the upper portion of each element is disposed on a side of the other element opposite a side that said intermediate portion is disposed on, with a transition portion of each element received in the recess of the other element.*

*29. Apparatus as claimed in claim 19 comprising a separate inverted T-section piece connected to a lower end of each said longitudinal rail.*

*30. Apparatus as claimed in claim 29 wherein each T-section piece comprises an upright clinch-locked to each said longitudinal rail.*

*31. A linear air diffuser as claimed in claim 29, wherein each said longitudinal rail is finished black and each T-section piece is finished a lighter color.*

*32. Apparatus as claimed in claim 19 wherein each said longitudinal rail has on an outer side a C-shaped recess receiving at least one connection plate.*

*33. Apparatus as claimed in claim 32 wherein said connection plate includes a portion extending laterally outwardly and upwardly beyond an upper edge of said longitudinal rail.*

*34. Apparatus as claimed in claim 19 wherein each connector member has a uniform cross-section.*

*35. Apparatus as claimed in claim 19 wherein one of the upper and lower blocks includes a tongue and the other of the upper and lower blocks includes a recess such that the tongue of the one block is received in the recess of the other block.*

*36. Apparatus as claimed in claim 19 wherein each of the upper and lower blocks includes a tongue and a transversely extending recess such that the tongue of each block is received in the recess of the other block.*

* * * * *